United States Patent
Gneuss et al.

(10) Patent No.: US 10,563,036 B2
(45) Date of Patent: Feb. 18, 2020

(54) METHOD OF ESTABLISHING PREDETERMINED VISCOSITIES WHEN RECYCLING POLYESTER WASTE

(71) Applicant: GNEUSS GmbH, Bad Oeynhausen (DE)

(72) Inventors: Detlef Gneuss, Bad Oeynhausen (DE); Stephan Gneuss, Bad Oeynhausen (DE); Daniel Gneuss, Charlotte, NC (US)

(73) Assignee: GNEUSS GMBH, Bad Oeyhausen (DE)

( * ) Notice: Subject to any disclaimer, the term of this patent is extended or adjusted under 35 U.S.C. 154(b) by 51 days.

(21) Appl. No.: 15/780,124

(22) PCT Filed: Nov. 29, 2016

(86) PCT No.: PCT/EP2016/079146
§ 371 (c)(1),
(2) Date: May 30, 2018

(87) PCT Pub. No.: WO2017/102313
PCT Pub. Date: Jun. 22, 2017

(65) Prior Publication Data
US 2018/0362723 A1 Dec. 20, 2018

(30) Foreign Application Priority Data
Dec. 18, 2015 (DE) .......................... 10 2015 226 043

(51) Int. Cl.
*C08J 11/24* (2006.01)
*C08J 11/14* (2006.01)

(52) U.S. Cl.
CPC ................ *C08J 11/14* (2013.01); *C08J 11/24* (2013.01); *C08J 2367/02* (2013.01); *Y02W 30/704* (2015.05); *Y02W 30/706* (2015.05)

(58) Field of Classification Search
USPC ........................................................ 521/48.5
See application file for complete search history.

(56) References Cited

U.S. PATENT DOCUMENTS 3,480,586 A    11/1969  Forster
6,162,837 A    12/2000  Gerking

FOREIGN PATENT DOCUMENTS

DE    1022006023354 A    11/2007

*Primary Examiner* — Terressa Boykin
(74) *Attorney, Agent, or Firm* — Andrew Wilford

(57) ABSTRACT

The aim is to refine a method of establishing a predetermined viscosity when recycling polyester wastes having inherently different viscosities in such a way that the desired final material has the appropriate viscosity after a fairly short time, and with little energy consumption, and the color of the melt is also to be influenceable. To this end, it is proposed that the polyester wastes are melted in a first zone (9) of an extruder (1) and the polyester wastes, due to the moisture introduced with them, undergo hydrolytic degradation, in a second zone (11) of the extruder (1) polycondensation takes place and hydrolytic degradation is counteracted and equalization of the viscosity differences is started, in a third zone (13) of the extruder (1) a solvent such as water or alcohol is added such that hydrolytic and/or glycolytic degradation of the melt take(s) place and result(s) in uniform viscosity of the melt, in a fourth zone (14) of the extruder (1) active mixing of the melt takes place and the melt is transferred from the extruder (1) into a polycondensation reactor (6), and the final desired viscosity of the melt is set in the polycondensation reactor (6).

10 Claims, 1 Drawing Sheet

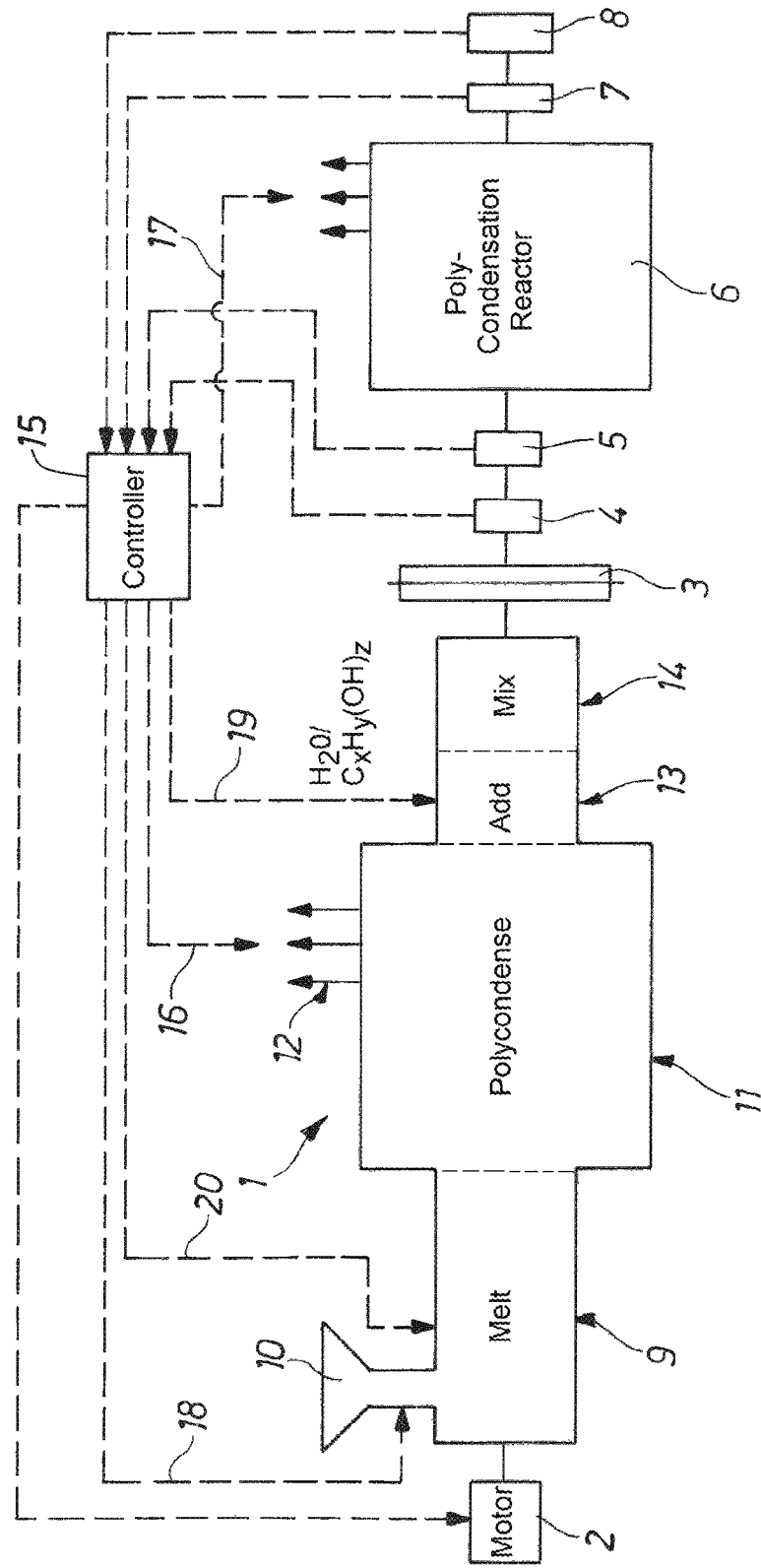

METHOD OF ESTABLISHING PREDETERMINED VISCOSITIES WHEN RECYCLING POLYESTER WASTE

CROSS REFERENCE TO RELATED APPLICATIONS

This application is the US-national stage of PCT application PCT/EP2016/079146 filed 29 Nov. 2016 and claiming the priority of German patent application 102015226043.7 itself filed 18 Dec. 2015.

The invention relates to a method of establishing a predetermined viscosity when recycling polyester wastes having inherently different viscosities.

In the recycling of polyester wastes of PET bottle flakes, for example, the individual bottle flakes of a charge routinely have different solution-intrinsic viscosities (iV). A uniform iV value is required for further processing of the melt produced from the bottle flakes, for example to manufacture carpet yarns, films, or also new PET bottles. In particular for further processing of 3 the melt to produce PET bottles, attention must be paid to the color of the PET bottles in addition to the iV value.

For influencing the viscosity in the recycling of polyester wastes, EP 942 035 [U.S. Pat. No. 6,162,837] proposes melting the polyester wastes, and in addition to the hydrolytic degradation that takes place due to the adherent moisture, the addition of an appropriate diol brings about glycolytic degradation of the melt, before the melt is brought to a desired degree of polymerization in the polycondensation process.

A great reduction in the iV value is accepted as a result of the hydrolytic and glycolytic degradation. To achieve a desired, higher iV value via the polycondensation procedure, the melt must be agitated in a reactor for an appropriate period of time at a predetermined negative pressure, thus subjecting the melt to lengthy thermal and mechanical degradation. In addition to the fairly large time expenditure, a corresponding high energy expenditure is also necessary to be able to set desired iV values.

A method for recycling polyester material has become known from DE 10 2006 023 354, according to which scrap polyester is initially processed in a complicated procedure, followed by admixture of fresh polyester and further processing in a high-viscosity melt reactor. Not only is there a high level of effort, but also pure recycling of the polyester is not possible.

The object of the invention is to improve a method and an apparatus in such a way that the desired final material is present with the appropriate viscosity after a fairly short time, and with little energy consumption, and the color of the melt is also to be influenceable.

To attain the object, it is proposed that the polyester wastes are melted in a first zone of an extruder and the polyester wastes and due to the moisture introduced with them, undergo hydrolytic degradation, then, in a second zone of the extruder, polycondensation takes place such that hydrolytic degradation is counteracted and equalization of the viscosity differences is started, then, in a third zone of the extruder, a solvent such as water or alcohol is supplied such that hydrolytic and/or glycolytic degradation of the melt take(s) place and result(s) in uniform viscosity of the melt, finally, in a fourth zone of the extruder, active mixing of the melt takes place and the melt is transferred from the extruder into a polycondensation reactor, and the final desired viscosity of the melt is set in the polycondensation reactor.

As a result of the counteraction, the hydrolytic degradation is substantially reversed, and the substantial reversal of the hydrolytic degradation may be between 10% and 70%. Due to the early reversal, in particular before additional hydrolytic and/or glycolytic degradation take(s) place, on the one hand the different iV values of the nonuniform starting material are already equalized, and on the other hand, the entire iV value range is increased before further hydrolytic or glycolytic degradation of the melt is initiated by supplying solvent. As a result of this early polycondensation, the iV value is already increased in the extruder, so that the iV value of the melt never drops as greatly as is the case, for example, with the above-described prior art. By feed solvent into the third zone of the extruder, the equalization of the iV values may be continued at a higher iV value level. However, the iV value of the melt will not drop as greatly as in the prior art, since in the present case one starts from a higher iV value. Furthermore, in the subsequent polycondensation reactor the melt, whose iV value starts from a higher level, needs to be influenced for an even shorter period of time, resulting not only in time saving, but also in significant energy saving, in the polycondensation reactor compared to the prior art.

The partial pressure of the solvent used in the present case water in the second zone of the extruder in which the hydrolytic degradation is reversed may be set in a range of 0.1 mbar to 50 mbar, preferably in a range of 2 mbar to 40 mbar. The partial pressure of the solvent used in the polycondensation reactor may be set between 0.1 mbar and 20 mbar, preferably between 0.5 mbar and 10 mbar.

During initial loading of the polyester wastes, between 0.1% and 1% and even >1% of the total input is introduced in the form of water. Due to the early reversal of the hydrolytic degradation, this water in the polycondensation zone of the extruder is discharged sooner, so that no disadvantages result due to a long residence time of the water in the polyester melt.

It has proven useful for the melt to be filtered at the outlet of the extruder, and for the intrinsic viscosity to be determined by ascertaining the viscosity of the melt prior to entering the polycondensation reactor and/or after exiting the polycondensation reactor.

A certain cleaning of the melt already takes place in the polycondensation extruder. However, it is advantageous to perform mechanical cleaning via a filter.

The determined viscosity values may then be used for controlling or regulating the supply of solvent and/or the pressure difference between the internal pressure and the external pressure at the polycondensation extruder and/or at the polycondensation reactor. The desired iV value at the outlet of the polycondensation reactor may thus be optimally adjusted via multiple control options.

In order to minimize the hydrolytic degradation and thus go into the subsequent process with the highest possible iV, attempts could be made to reduce the water content.

However, due to the residual materials and contaminants that are always present in scrap polyester, yellowing of the polyester occurs in practice. It has now been surprisingly shown, however, that the higher the water content that is selected in the input stage, the first zone of the extruder, the less yellowing occurs in the melt. The water content must be at least 0.1% in order to achieve a reduction. A particularly efficient operating procedure is realized when the water content is set between 0.3 and 1.5%.

Although even higher water contents may allow a further reduction in the yellow index, there are disadvantages during the subsequent reversal of the hydrolytic degradation.

A particular advantage thus results according to the invention when the yellow index of the melt is determined downstream from the extruder and/or downstream from the polycondensation reactor in the flow direction, and the $H_2O$ content in the first zone of the extruder and/or in the third zone of the extruder is set as a function of the determined yellow index. This results in further cleaning of the melt, which correspondingly influences the yellow index. The water content prior to the first stage or in the first stage should be increased to the level that the yellow index b* of the final product is reduced by at least 20 to 50%, relative to water-free polyester.

It is optimal for the yellow index to be determined not, for example, by an operator, using values based on experience, but, rather, using an optical measuring method. The yellow indices determined by the optical measuring method may then be used in an even more accurate manner for influencing the $H_2O$ content of the melt prior to or in the first zone of the extruder and in the third zone of the extruder.

The invention is explained in greater detail with reference to a single drawing FIGURE.

The FIGURE shows an extruder 1 that is driven by a motor 2. Downstream from the extruder 1 are a filter 3, a viscometer 4, an optical sensor 5, a polycondensation reactor 6, a viscometer 7, and an optical sensor 8.

The extruder 1 has a first zone 9 into which polyester wastes may be introduced via an feeder 10 and melted. The extruder 1 also has a second zone 11 as a polycondensation portion. Vacuum 12 is applied to the polycondensation portion 11.

A solvent such as water and/or an alcohol may be introduced into the extruder 1 in a third zone 13 of the extruder 1, and the melt is mixed in a fourth zone 14 of the extruder 1.

The sensors 4, 5, 7, and 8 are connected to a controller 15 that is able to not only influence the rotational speed of the motor 2 but also to adjust the pressure in the extruder 1 via the control line 16, and the pressure in the polycondensation reactor 6 via the control line 17. The quantity and type of solvent that may be introduced into the first portion 9 of the extruder 1 and/or into the third portion 13 of the extruder 1 at various locations may be influenced via the control lines 18, 19, and 20.

| List of reference numerals | |
|---|---|
| 1 | extruder |
| 2 | motor |
| 3 | filter |
| 4 | viscometer |
| 5 | optical sensor |
| 6 | polycondensation reactor |
| 7 | viscometer |
| 8 | optical sensor |
| 9 | first zone (of extruder) |
| 10 | feeder |
| 11 | second zone (polycondensation zone of extruder) |
| 12 | vacuum |
| 13 | third zone (of extruder) |
| 14 | fourth zone (of extruder) |
| 15 | controller |
| 16 | control line |
| 17 | control line |
| 18 | control line |
| 19 | control line |
| 20 | control line |

The invention claimed is:

1. A method of establishing a predetermined viscosity when recycling polyester wastes having inherently different viscosities, the method comprising the steps of:

melting moist polyester wastes in a first zone of a four-zone extruder such that, due to the moisture, the polyester wastes undergo hydrolytic degradation;

maintaining a water content in the first zone at least at 0.1%;

polycondensing the melted and hydrolytically degraded polyester wastes in a second zone of the extruder such that the hydrolytic degradation is counteracted and equalization of the viscosity differences is started;

in a third zone of the extruder adding solvent such that hydrolytic and/or glycolytic degradation of the melt take place and result in uniform viscosity of the melt, in a fourth zone of the extruder actively mixing of the melted and polycondensed polyester wastes;

transferring the melt from the fourth zone of the extruder into a polycondensation reactor; and setting the final desired viscosity of the melt in the polycondensation reactor.

2. The method according to claim 1, further comprising the steps of:

filtering the melted polyester wastes at an outlet of the extruder; and determining an intrinsic viscosity of the filtered melted polyester wastes by ascertaining the viscosity of the melted polyester wastes prior to entering the polycondensation reactor and/or after exiting the polycondensation reactor.

3. The method according to claim 2, further comprising the step of:

using the determined viscosity for controlling the supplying of solvent and/or the pressure difference between the internal pressure and the external pressure at the polycondensation extruder and/or polycondensation reactor.

4. The method according to claim 1, further comprising the steps of:

determining a yellow index of the melt downstream from the extruder and/or downstream from the polycondensation reactor in a flow direction, and setting an $H_2O$ content in the first zone of the extruder and/or in the third zone of the extruder as a function of the determined yellow indices.

5. The method according to claim 4, wherein the yellow index is determined by an optical measuring method.

6. The method according to claim 1, further comprising the step of:

limiting a moisture content in the first zone to between 0.1% and 1%.

7. The method according to claim 1, further comprising the step of:

limiting a moisture content in the first zone to between 0.3% and 1.5%.

8. The method according to claim 1, further comprising the step of:

maintaining in the second zone a partial vacuum of between 2 mbar and 40 mbar.

9. The method according to claim 1, further comprising the step of:

maintaining in the second zone a partial vacuum of between 0.1 mbar and 20 mbar.

10. The method according to claim 1, further comprising the step of:

maintaining in the polycondensation reactor a partial vacuum of between 0.5 mbar and 10 mbar.

* * * * *